United States Patent [19]
Suzuki

[11] Patent Number: 6,125,304
[45] Date of Patent: Sep. 26, 2000

[54] COORDINATE DATA CONVERTING METHOD AND DEVICE THEREOF

[75] Inventor: Takashi Suzuki, Yamagata, Japan

[73] Assignee: Yamagata Casio Co., Ltd., Yamagata, Japan

[21] Appl. No.: 09/078,948

[22] Filed: May 14, 1998

[51] Int. Cl.[7] .............................. G05B 19/00; G06F 19/04
[52] U.S. Cl. .......................... 700/182; 700/182; 700/90; 700/194; 700/251; 700/165; 700/95; 701/300; 707/502; 708/442; 345/418; 342/357.12; 364/731
[58] Field of Search .............................. 700/182, 90, 194, 700/251, 145, 165, 95; 708/442; 345/418; 342/357.12; 701/213, 300; 364/731, 815; 707/502

[56] References Cited

U.S. PATENT DOCUMENTS

| | | | |
|---|---|---|---|
| 4,734,864 | 3/1988 | Kawamura et al. | 364/474.23 |
| 5,270,627 | 12/1993 | Rehse | 318/585 |
| 5,696,837 | 12/1997 | Green | 382/128 |
| 5,751,586 | 5/1998 | Grabovac | 700/169 |

*Primary Examiner*—Ayaz R. Sheikh
*Assistant Examiner*—Firmin Backer
*Attorney, Agent, or Firm*—Frishauf, Holtz, Goodman, Langer & Chick, P.C.

[57] ABSTRACT

The present invention aims at providing a coordinate data converting method, which is adaptable to any coordinate data in different data formats, for converting coordinate data into predetermined coordinate data, and a device thereof. A conversion parameter master table (conversion PMT) is generated in a memory with a maintenance process (process ST1) in advance. In each conversion parameter table (conversion PT) of the conversion PMT, the data of 9 items such as a code format, data format, coordinate system, unit system, offset, flow direction, PCB size, data item, and special command specification are set in correspondence with diversified coordinate data of a CAD system, an NC system, etc. A suitable conversion PT is selected with a process S1; a conversion source file of CAD data, etc., a conversion destination file according to the present invention, a board size, and a flow direction are set with a process S2; and the data of the set conversion source file is read from a memory in a record unit, converted using the conversion PT, and written to the conversion destination file of the memory with a process S3.

Since the conversion parameter master table for which the editing such as an addition, modification, deletion, etc. can be performed for the coordinate data of various systems is prepared beforehand as described above, the coordinate data of another system can be converted into the coordinate data of a local system without generating a dedicated conversion process program, thereby eliminating the need for generating a dedicated conversion process program each time coordinate data different from that of the local system is handled. As a result, both the operation efficiency of the coordinate data conversion process and user operability of a part mounting device are improved.

3 Claims, 11 Drawing Sheets

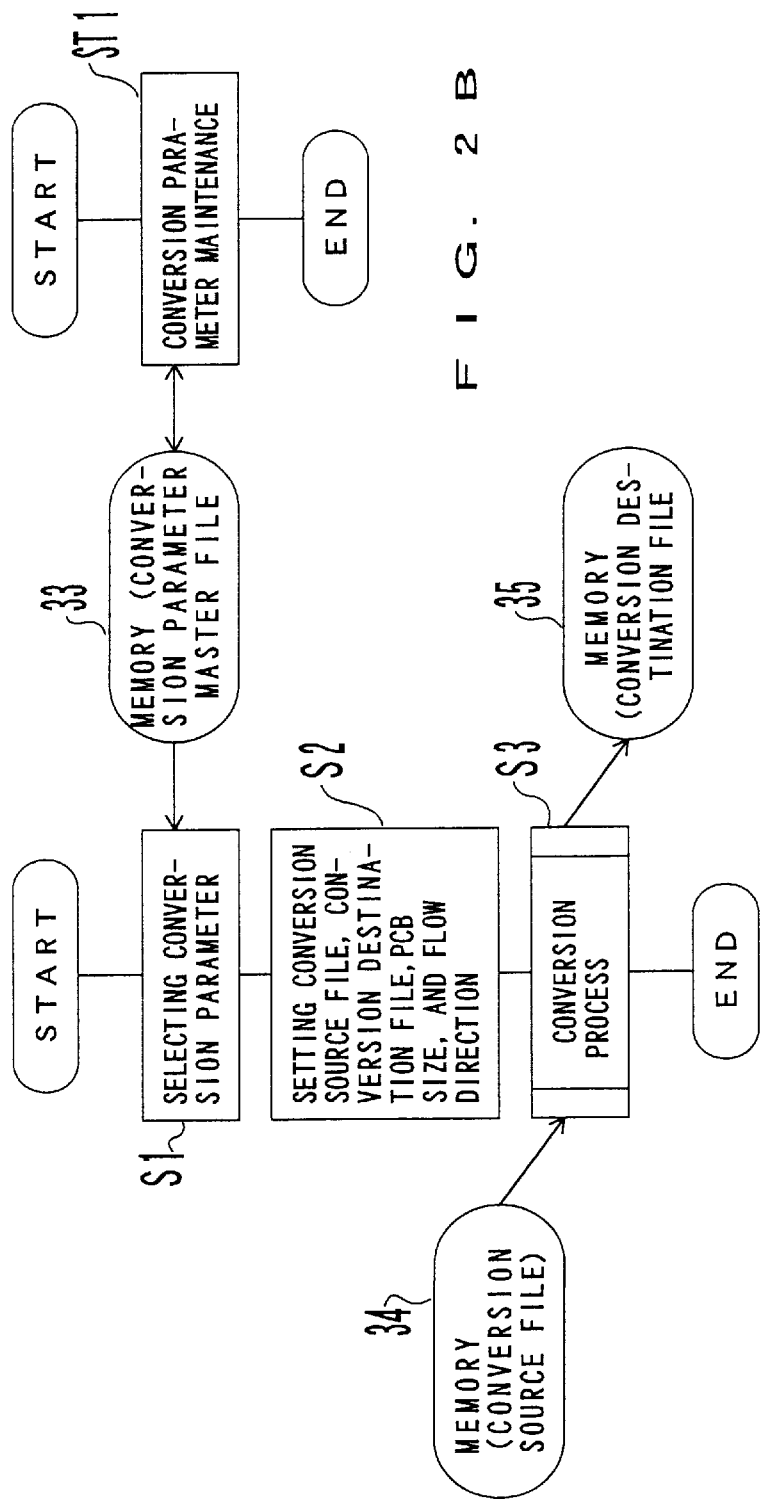
FIG. 2A / FIG. 2B

| No. | PATTERN | CONTROL | TARGET | COMMENT |
|---|---|---|---|---|
| 0001 | MARK. | P | 0 | |
| 0002 | T$ | ST-0 | 0 | |
| 0003 | [A-Z] [A-Z] [A-Z] | ED-0 | 0 | |
| 0004 | [0-9] [0-9] | EX-0 | 0 | |
| 0005 | R* | SKIP | 0 | |
| 0006 | ^X | GREP | 0 | |
| 0007 | | | 0 | |
| 0008 | | | 0 | |

FIG. 6A

```
      : CODE CANCELLATION
SKIP  : LINE SKIP
GREP  : LINE CAPTURE
ST-0  : RANGE REGISTRATION START
ED-0  : RANGE REGISTRATION END
EX-0  : RANGE DEVELOPMENT
D     : ONLY SPREADING
M     : ONLY MOUNTING
N     : NOT SPREADING AND MOUNTING
O     : BOARD RECOGNITION WITH ONE POINT
P     : BOARD RECOGNITION WITH TWO POINTS
Q     : Mark Recognition
```

FIG. 6B

| ₄₁ | ₄₂ | ₄₃ | ₄₄ | ₄₅ | ₄₆ |
|---|---|---|---|---|---|
| X | Y | θ | CONTROL | PART NAME | COMMENT |
| 12 | 22 | 32 |  | Chip-R | R-10 |

FIG. 8A

| ₄₁ | ₄₂ | ₄₃ | ₄₄ | ₄₅ | ₄₆ |
|---|---|---|---|---|---|
| X | Y | θ | CONTROL | PART NAME | COMMENT |
| 0.0012 | 0.0022 | 0.0032 |  | Chip-R | R-10 |

FIG. 8B

| ₄₁ | ₄₂ | ₄₃ | ₄₄ | ₄₅ | ₄₆ |
|---|---|---|---|---|---|
| X | Y | θ | CONTROL | PART NAME | COMMENT |
| 0.0 | 0.0 | 0 | ST-0 |  |  |

FIG. 8C

EXAMPLE OF CAD DATA  37

```
1  START
2  T1   10.0  15.0  00.0  AAA  C01
3  T2   15.0  20.0  90.0  BBB  R01
4  T3   15.0  25.0  00.0  AAA  C02
5  END
6  E1    0.0   0.0   0.0
7  E2   50.0   0.0   0.0
8  E3    0.0  50.0   0.0
9  E4   50.0  50.0   0.0
```

FIG. 10A

CONVERTION

38 EXAMPLE OF SEARCH PARAMETER FILE

| | SEARCH PATTERN | ACTION |
|---|---|---|
| 1 | ^ START | ST-0 |
| 2 | ^ END | ED-0 |
| 3 | ^ E [0-9] | EX-0 |
| 4 | ^ T [0-9] | GREP |

FIG. 10B

39 EXAMPLE OF CONVERSION DESTINATION FILE

| | X | Y | θ | CON-TROL | PART NAME | COM-MENT | |
|---|---|---|---|---|---|---|---|
| 1 | 0.0 | 0.0 | 0 | ST-0 | | | |
| 2 | 10.0 | 15.0 | 0 | | AAA | C01 | |
| 3 | 15.0 | 20.0 | 90 | | BBB | R01 | |
| 4 | 15.0 | 25.0 | 0 | | AAA | C02 | |
| 5 | 0.0 | 0.0 | 0 | ED-0 | | | |
| 6 | 0.0 | 0.0 | 0 | EX-0 | | | ←EXECUTION OF FIRST CHILD BOARD |
| 7 | 50.0 | 0.0 | 0 | EX-0 | | | ←EXECUTION OF SECOND CHILD BOARD |
| 8 | 0.0 | 50.0 | 0 | EX-0 | | | ←EXECUTION OF THIRD CHILD BOARD |
| 9 | 50.0 | 50.0 | 0 | EX-0 | | | ←EXECUTION OF FOURTH CHILD BOARD |

FIG. 10C

COORDINATE DATA CONVERTING METHOD AND DEVICE THEREOF

BACKGROUND OF THE INVENTION

1. Field of the Invention

The present invention relates to a coordinate data converting device for converting coordinate data generated by a CAD system or an NC system into predetermined coordinate data.

2. Description of the Related Art

Conventionally, a program for performing a part mounting process had to be incorporated into a part mounting device beforehand in order to automatically mount electronic parts (simply referred to as parts hereinafter) on a circuit board (simply referred to as a board hereinafter) by driving the part mounting device. For the program incorporation, at least the data such as the name of a part to be mounted, the mounting position coordinate on a board, the orientation of the part to be mounted on the board, etc. are required for each board on which parts are mounted, and a program including these pieces of data must be generated beforehand and stored in the part mounting device.

If coordinate data or part names are manually input while inspecting a board design or a part list obtained from the board design, etc., there is a great possibility that inputs are erroneously made. Accordingly, the coordinate data generated by a CAD system or an NC system is frequently used by being automatically captured and converted into coordinate data of a local system.

If the system or the type (maker) of the CAD or the NC that generates the coordinate data handled at this time is different, the format, the unit, the coordinate system, the offset value, etc. of the data forming the coordinate data are different. Therefore, the coordinate data cannot be used as data in a common format as it is. For example, as a system which generates a program for mounting parts or generates coordinate data for the program, an MS-DOS system, an OS-9 system, a UNIX system, a general-purpose computer (mainframe CAD) system, etc. are generally used. These systems differ from a CAD system or an NC system which simply generates coordinate data on a design drawing.

For a board design, the machine type of a CAD or an NC to be used for a design may frequently differ depending on a design department even within a company. Needless to say, a design system or a machine type can be hardly unified if a design is externally ordered. Additionally, if a new type of a CAD or NC machine is put on the market, or if a CAD machine or an NC machine is introduced from a new maker, systems and machine types may be mixed up.

When a program for running a part mounting device is generated based on design data (coordinate data) in a manufacturing department of the part mounting device, a dedicated conversion process program which makes a one-to-one correspondence with each design data of a CAD machine or an NC machine of a different type is generated each time; the coordinate data is converted into the coordinate data of a local system by using the program; and the program of the part mounting device is generated, in order to allow the program to be used with the processing system of the part mounting device.

However, if an exclusive conversion program which makes a one-to-one correspondence with each coordinate data to be handled is generated by the manufacturing department of the part mounting device each time and the coordinate data is converted as described above, it requires a considerable amount of time to generate the conversion process program, and the efficiency of the vital generation of the program for mounting parts decreases. As a result, there is the problem that the progress of operations until completion/shipment of the part mounting device is delayed and the delivery is apt to be late.

Furthermore, an unsatisfactory situation where a high generation cost of such an exclusive conversion program is charged to a client may often occur.

SUMMARY OF THE INVENTION

The present invention was developed due to the above described conventional background, and aims at providing a coordinate data converting method, which can be applied to any of coordinate data in a variety of data formats, for easily converting coordinate data into predetermined coordinate data, and a device thereof.

A coordinate data converting device according to a first invention comprises an editing means for allowing a parameter of a table which corresponds coordinate data of another system to the coordinate data of its own system to be edited with an input; a capturing means for sequentially capturing the coordinate data generated by another system in a record unit; and a coordinate system converting means for converting the coordinate system of the coordinate data captured by the capturing means into the coordinate system of the coordinate data for its own system while referencing the parameter of the table; a coordinate value converting means for expanding, reducing, rotating, or parallel translating the coordinate data converted by the coordinate system converting means according to the coordinate system and the unit of the coordinate data of its own system while referencing the parameter of the table; a skipping means for stopping capture of the record if the character string in the record captured by the capturing means matches a predetermined search pattern in reference to the parameter of the table; a capturing determining means for determining the capture of the record if the character string in the record captured by the capturing means matches a predetermined search pattern in reference to the parameter of the table; a control addition capturing means for adding a control code in correspondence with a search pattern preset in the table to the record and capturing the record if the character string in the record captured by the capturing means matches the predetermined search pattern in reference to the parameter of the table; a flow coordinate converting means for further coordinate-converting the coordinate data that the coordinate system converting means converts for its own system according to the flow direction of a board while referencing the parameter of the table; and an outputting means for outputting the coordinated data converted for its own system.

A coordinate data converting method according to a second invention is a method for converting the coordinate data that another system generates using a programmed computer into the coordinate data of a local system. This method comprises the steps of: allowing a parameter of a table which makes a correspondence between the coordinate data of another system and that of the local system to be edited with an input; sequentially capturing the coordinate data generated by another system in a record unit; converting the coordinate system of the captured coordinate data into the coordinate system of the coordinate data for the local system while referencing the parameter of the table; expanding, reducing, rotating, or translating the converted coordinate data according to the coordinate system and the unit of the coordinate data of the local system while referencing the parameter of the table; stopping capture of the record if the character string in the captured record matches a predetermined search pattern in reference to the parameter of the table; determining the capture of the record if the character string in the captured record matches a predetermined search pattern in reference to the parameter of the table; adding a control code in correspondence with a search pattern preset in the table to the record and capturing the record if the character string in the captured record matches the predetermined search pattern in reference to the parameter of the table; further coordinate converting the coordinate data converted for the local system according to the flow direction of a board while referencing the parameter of the table; and outputting the coordinate data converted for the local system.

A storage medium according to a third invention is a storage medium storing a program for converting the coordinate data generated by another system into the coordinate data of a local system. The program directs a computer to perform the functions of: allowing a parameter of a table which makes a correspondence between the coordinate data of another system and that of the local system to be edited with an input; sequentially capturing the coordinate data generated by another system in a record unit; converting the coordinate system of the captured coordinate data into the coordinate system of the coordinate data for the local system while referencing the parameter of the table; expanding, reducing, rotating, or parallel translating the converted coordinate data according to the coordinate system and the unit of the coordinate data of the local system while referencing the parameter of the table; stopping capture of the record if the character string in the captured record matches a predetermined search pattern in reference to the parameter of the table; determining the capture of the record if the character string in the captured record matches a predetermined search pattern in reference to the parameter of the table; adding a control code in correspondence with a search pattern preset in the table to the record and capturing the record if the character string in the captured record matches the predetermined search pattern in reference to the parameter of the table; further coordinate-converting the coordinate data converted for the local system according to the flow direction of a board while referencing the parameter of the table; and outputting the coordinate data converted for the local system.

As described above, according to the present invention, a conversion parameter master table for which the editing operations such as an addition operation, modification operation, deletion operation, etc. for the coordinate data of various systems can be performed is prepared beforehand. Therefore, the coordinate data of another system can be converted into the coordinate data for a local system without generating an exclusive conversion process program, thereby eliminating the need for generating an exclusive conversion process program each time the coordinate data different from that of the local system is handled. As a result, both the operation efficiency of the coordinate data conversion process and the user operability of the part mounting device are improved.

BRIEF DESCRIPTION OF THE DRAWINGS

FIG. 2A is a flowchart showing the process for converting coordinate data generated by a CPU of another system into desired coordinate data;

FIG. 2B is a flowchart showing the process for performing maintenance (such as generation, update, etc.) of the conversion parameter table used by the above described process;

FIG. 6A shows an input screen for specifying a special command;

FIG. 6B shows a control code table displayed on a screen for a selection input;

FIGS. 8A through 8C show the data structures of a work file which is temporarily generated in the coordinate data conversion process;

FIG. 10A exemplifies CAD data in a conversion source file;

FIG. 10B exemplifies a search parameter file;

FIG. 10C exemplifies a conversion destination file converted from the CAD data.

DESCRIPTION OF THE PREFERRED EMBODIMENTS

Figure 1A:
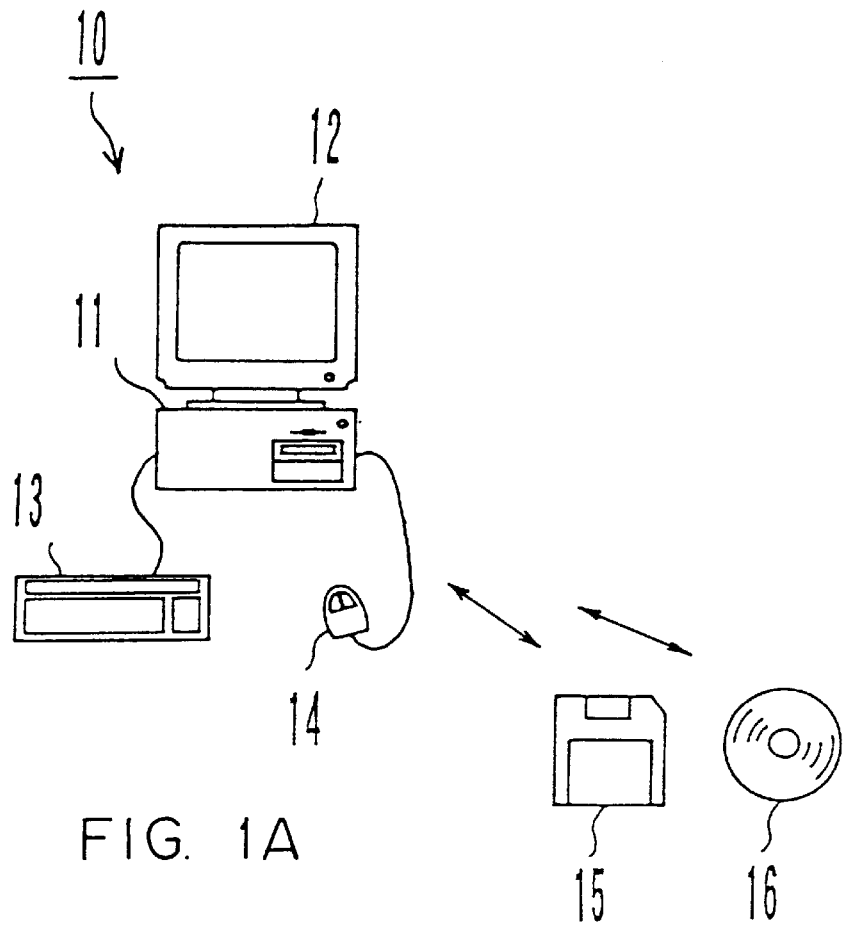
FIG. 1A is a schematic diagram showing the entire configuration of a coordinate data converting device according to a preferred embodiment.

Provided below is the explanation about the preferred embodiments according to the present invention, by referring to the drawings.

Figure 1B:
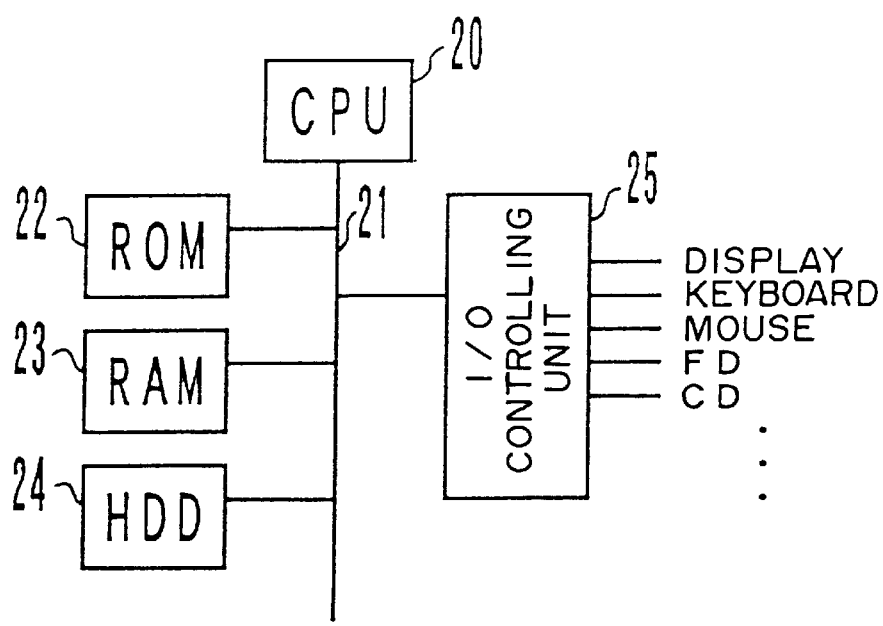
FIG. 1B is a block diagram showing the system configuration of the coordinate data converting device according to the preferred embodiment.

FIG. 1A is a schematic diagram showing the entire configuration of a coordinate data converting device according to a preferred embodiment, while FIG. 1B is a block diagram showing its system configuration. As shown in FIG. 1A, a coordinate data converting device 10 consists of, for example, a personal computer, etc. Its main body 11 is connected with a display 12, a keyboard 13, and a pointing device (mouse) 14 via connection cables. Additionally, a floppy disk (FD) 15, a compact disc (CD) 16, etc., which are intended for loading a program or storing generated data, are freely inserted/ejected into/from the main body 11.

The system of the coordinate data converting device 10 comprises a CPU (Central Processing Unit) 20, a ROM (Read Only Memory) 22 connected to the CPU 20 via a bus 21, a RAM (Random Access Memory) 23, an HDD (internal hard disk) 24, an I/O controlling unit 25, etc. as shown in FIG. 1B.

The ROM 22 stores a control program of the coordinate data converting device 10. The CPU 20 controls the operations of the above described components according to the control program.

The RAM 23 temporarily stores data input from the keyboard 13, intermediate data being calculated by the CPU 22, etc.

The HDD 24 stores various data, files, tables, etc. input from the keyboard 13 or read from an external storage medium (the FD 15 or the CD 16), and transfers the data, files, tables, etc. to the RAM 23 according to the control of the CPU 20.

The I/O controlling unit 25 is connected with the above described display 12, keyboard 13, mouse 14, FD 15, CD 16, etc. The I/O controlling unit 25 is further connected with a printer which is not shown in this figure. This unit controls the inputs/outputs of each of the connected components according to the control of the CPU 20.

The display 12 consists of a CRT display (an LCD device, etc. may be used), and displays input data or a result of an arithmetic operation performed by the CPU 20.

The keyboard 13 comprises a plurality of operation keys for inputting numerals, characters, and various commands, and outputs the status signal of the operation keys to the CPU 20. The mouse 14 outputs a two-dimensional move speed signal, and specifies an arbitrary position on the screen of the display 12.

The FD 15 stores the above described various data, files, tables, etc. or outputs the data, files, tables, etc. to the RAM 23 or the HDD 24.

The CD 16 stores a coordinate data conversion program, and outputs the program to the HDD 24 or the RAM 23 depending on need. The coordinate data conversion program may be stored onto the FD 15.

The CPU 20 converts the coordinate data of CAD data or NC data into desired coordinate data based on a command input from the keyboard 13 while controlling the above described components. Provided below is the explanation about this conversion process.

FIG. 2A is a flowchart showing the process for converting the coordinate data generated by another system into desired coordinate data, which is performed by the CPU 20. FIG. 2B is a flowchart showing the maintenance process for generating, updating, etc. the conversion parameter table used in the above described coordinate data converting process.

Note that the part mounting system according to this preferred embodiment processes the mounting information of each part on a board, in a record unit. For example, the coordinate data of the CAD data for mounting 100 parts is assumed to be composed of at least 100 records. Additionally, since how to store data inside a CAD machine is not known, only a text file which can be viewed and read by human eyes is handled as a conversion target according to the present system.

The mounting position information of a record is assumed to include the mounting position coordinates X, Y, and θ on a board on the basis of the center position of a part as minimum data. Note that, however, its coordinate system or unit system may be an arbitrary system. By way of example, a double-magnification system, an inch system may be available. Additionally, a part type is assumed to be attached with a part code which proves its standard to be identical. With this system, a tape cassette is allocated on a cassette board based on the part code. In this case, the part code and the number of the tape cassette holding the corresponding part on the tape make a one-to-one correspondence (the number of the tape cassette is different from the number of the mounting position on the cassette board).

Provided first is the explanation about the maintenance process of the conversion parameter table shown in FIG. 2B. In step ST1 of FIG. 2B, the conversion parameter table is maintained. For the maintenance, the data of 9 items such as a (1) record type, (2) data format, (3) coordinate system, (4) unit system, (5) offset, (6) flow direction, (7) PCB (board) size, (8) data item, and (9) specifying a special command, are specified.

The setting of the (1) record type specifies whether a data record is either of a variable-length type or of a fixed-length type. Each variable-length record is described in one line. The record is delimited by "CR" or "LF". The fixed-length record is a record whose record size is fixed. For example, a record of 128-byte fixed-length can be cited.

The setting of the (2) data format specifies whether data is in an address format, in a delimiter format, or in a fixed-column format. If read data has no regularity, it is unknown which pieces of data indicate X and Y coordinates. Accordingly, for the design data generated by any CAD system or NC system, the mounting information of each part is arranged in a record according to predetermined rules as data items. This regularity is specified by the data format.

In the address format, the start of each data such as the X coordinate, Y coordinate, rotational angle θ, part number, comment, etc. is indicated by an address word (symbol). In the delimiter format, the above described each data is delimited by a comma, a space, a tab, etc. In the fixed-column format, each data is delimited by a preset length. As a comment, the sequence number indicating the mounting position of a silk-printed part on a board, which is normally called a silk, is described depending on need.

Figure 3A:
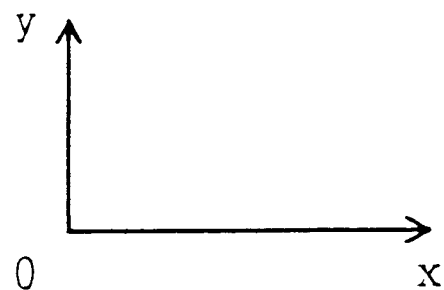
FIGS. 3A through 3D are schematic diagrams showing the coordinate systems whose plus directions of X or Y axes are different from each other.
Figure 3B:
Figure 3C:
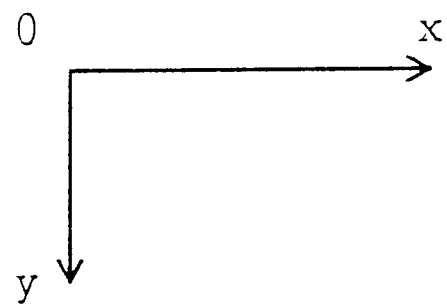
Figure 3D:
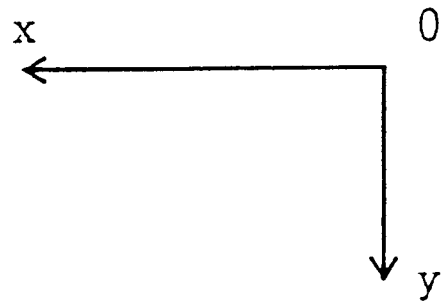

For the (3) coordinate system, the plus directions of the X, Y and θ axes are set. FIGS. 3A and 3B show the coordinate systems where the plus direction of the Y axis goes upward, while FIGS. 3C and 3D show the coordinate systems where the plus direction of the Y axis is downward. Among these figures, FIGS. 3A and 3C show the coordinate systems where the plus direction of the X axis is to the right, while FIGS. 3B and 3D show the coordinate systems where the plus direction of the X axis is to the left. The plus direction of the θ axis is used to indicate whether the rotational direction of a coordinate is either clockwise or counterclockwise.

The (4) unit system indicates the display magnification of the X, Y, and θ axes. This example adopts a millimeter (mm) and a degree (°) as standards. Accordingly, if a certain system is set so that its coordinate value "100" indicates 1 mm, the unit system of this system is specified to be 0.001.

For the (5) offset, the data indicating the amounts of corrections of the X, Y, and θ axes are set. For example, the difference between the origin of data in a CAD conversion source file and the origin of data in a conversion destination file is the amount of a correction (an offset amount or an offset value).

Figure 4A:
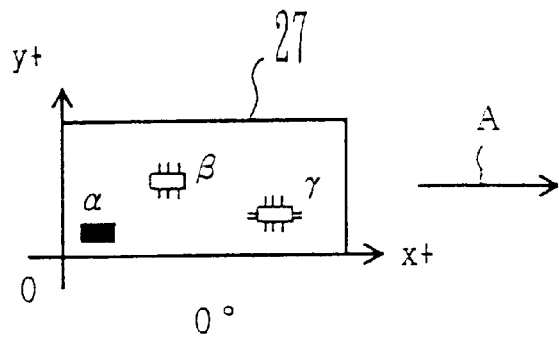
FIGS. 4A through 4D are schematic diagrams showing the relationship between the flow direction (conveying direction) of a board and angular data.

For the (6) flow direction, the data indicating the direction when a board is conveyed to a part mounting device. In FIGS. 4A through 4D, the right direction indicated by an arrow "A" in FIG. 4A is assumed to be the flow direction (conveyance direction) of a board. If the direction of a board 27 shown in FIG. 4A is the flow direction of a board, which is set in CAD or NC source data, this is defined to be "0°". If the direction of the board 27, which is to be set in conversion destination data, is the directions shown in FIGS. 4B, 4C, and 4D, they are respectively set to be "90°", "180°", and "270°".

For the (7) PCB size, the data including the board size in the X and Y axes directions. Note that the items (6) flow direction and (7) PCB size can be changed with an input immediately before the conversion process using the conversion parameter table.

For the (8) data item, the data storage format is further set in correspondence with the data format specified with the above described (2) data format.

Figure 5A:
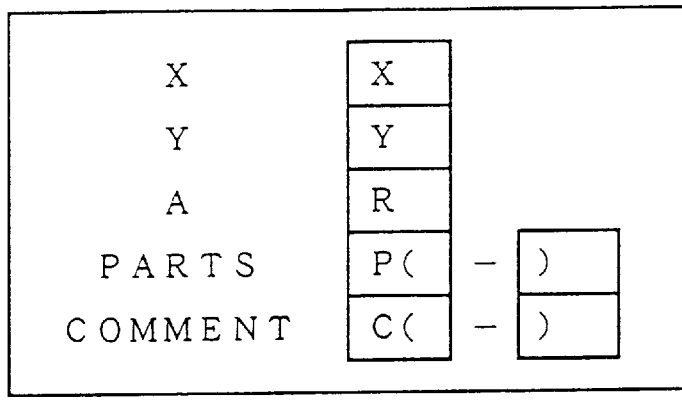
FIGS. 5A through 5C exemplify input screens in an address format, a delimiter format, and a fixed-column format of data items in the maintenance process of the conversion parameter table.
Figure 5B:
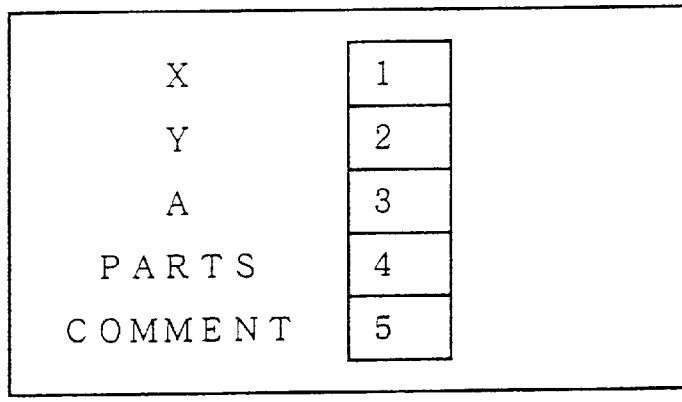
Figure 5C:
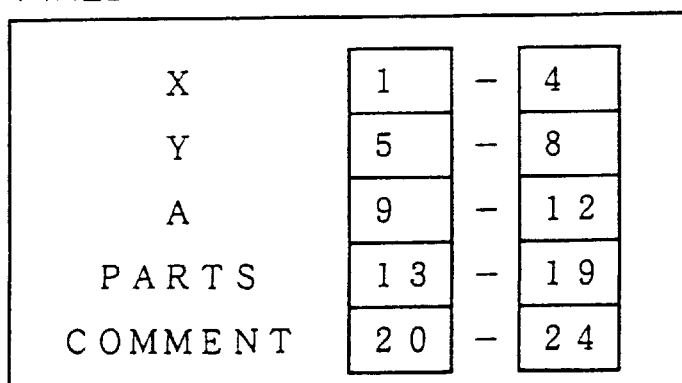

FIGS. 5A through 5C exemplify input screens for the maintenance process in the above described (8) data type. A data format input screen is first displayed so as to specify a data format although this is not shown in this figure. A data input button on a display screen is operated using a pointing device after this specification, so that the data input screen of the specified data format will appear.

By way of example, in the address format, data names "X", "Y", "A", "PART", and "COMMENT" are displayed in 5 rows from the top in the left side of an input screen 28, and 5 input frames are respectively displayed in the right side in correspondence with the data names as shown in FIG. 5A. To the input frames, "X", "Y", "R", "P(", and "C(" are input as the respective address words (address symbols of the X axis data, Y axis data, θ axis data, part name and the comment. To the part name and the comment, a terminator (terminating symbol) ")" is further input. If the terminator is not input, that is, if "no terminating specification" is made, up to the end of a record is handled as the part name or the comment.

A data sequence "X12Y22R23P (Chip-R) C (R-10)" shown at the bottom of the input screen 28 of FIG. 5A is an example of the data sequence of the above described address format, and is provided for reference. In this example, the numeral "12" next to the address word "X" is the coordinate data of the X axis. Similarly, the numeral "22" next to the address word "Y" is the coordinate data of the Y axis. The numeral "32" next to the address word "R" is an angle. The characters "Chip-R" enclosed by "P(" and ")" is a part name, while the alphanumerals "R10" enclosed by "C(" and ")" is a comment.

If the delimiter format is specified on a data format input screen, the screen prompting an input of a delimiter (such as ",", a space, etc.) is displayed. Here, if "," is input as a delimiter and a data input button is operated, the data input screen of the delimiter format will appear. Also in this case, data names "X", "Y", "A", "PARTS", and "COMMENT" are displayed in 5 rows in the left side of an input screen 29, and five input frames are respectively displayed in the right side in correspondence with the data names as shown in FIG. 5B. For the input frames, the orders of the data separated by delimiters in the data sequence are specified. In this example, the first, second, third, fourth, and fifth specifications are made from the top as the orders of the data in the data sequence.

A data sequence "12, 22, 32, Chip-R, R10" shown at the bottom of the input screen 29 of FIG. 5B depicts the data sequence in the above described delimiter format. The first data, that is, the initial data "12" delimited by "," is the coordinate data of the X axis. Similarly, the second delimited data "22" is the coordinate data of the Y axis; the third data "32" is angular data; the fourth characters "Chip-R" is a part name; and the fifth alphanumerics "R-10" is a comment. The data group of these data is exactly the same as that described in the address format shown in FIG. 5A. However, since its description format is different, this data group structures the data sequence which cannot be uniformly handled as it is.

For the fixed-column format, data names "X", "y", "A", "PART", and "COMMENT" are displayed in five rows in the left side of an input screen 30 also in this case as shown in FIG. 5C. Five pairs of hyphenated left and right input frames are displayed in five rows in correspondence with the data names. To the input frames, the first and last digits of each data in the data sequence are input. In this example, the X axis data specification ranges from the 1st to 4th digits; the Y axis data specification ranges from the 5th to 8th digits; the θ axis data specification ranges from the 9th to 12th digits; the part name specification ranges from the 13th to 19th digits; and the comment specification ranges from the 20th to 24th digits with inputs.

The data sequence "122232Chip-RR-10" shown at the bottom of the input screen 30 of FIG. 5C indicates the data sequence in the fixed-column format. An underscore "" indicates a space (not a delimiter, but an empty column of data in this case). All the data are right-aligned and displayed within the above described specified digit ranges. Also in this case, the first data "12" indicates the coordinate data of the X axis; the second data "22" is the coordinate data of the Y axis; the third data "32" is the angular data; the fourth characters "Chip-R" indicate the part name; and the fifth alphanumerics "R-10" indicate the comment. Although the group of these data is exactly the same as those shown in FIGS. 5A and 5B, its description format is different as described above.

The last maintenance process is the (9) special command specification. In this process of special command specification, the specification is made for each data sequence (hereinafter referred to as a line or a record) and describes such as targeting only the line (data sequence, record) including a certain keyword, not targeting a line including a certain character string, handling only a line (record) for mounting, or handling a line with a recognition mark, etc. In this process of the special command specification, ten pairs of the description of a search pattern and the description of a corresponding operation (an action or a control code) can be input.

FIG. 6A shows an input display screen for processing special command specification. The search pattern to be described in a pattern column 31-1 on the input display screen 31 may be described with also a known description method which is generally referred to as a regular expression. For example, "." indicates one arbitrary character. Accordingly, "MARK." is described when both of "MARK1" and "MARK2" are desired to be searched. Since "$" indicates the end (line end) of data, "T$" indicates that the data sequence terminating with "T" is searched. "[–]" indicates one arbitrary character in the character string enclosed by "[" and "]". "–" is a range specifying symbol. That is, "[A–Z]" indicates one of uppercase letters "A" to "Z". Accordingly "[A–Z] [A–Z] [A–Z]" indicates that the data sequence where three successive characters are alphabetical uppercase letters is searched. Similarly, "[0–9] [0–9]" indicates that the data sequence where two successive characters are the numerals from 0 to 9 is searched. Additionally, if both of the character strings "Top" and "top" are desired to be searched, "[Tt]op" will be described (although this is not shown in this figure). Furthermore, "*" indicates 0 or more repetition of an immediately preceding character. "R*" therefore indicates that the data sequence where "R" successively appears once or more. "^" indicates the start of a data sequence (the beginning of a line). Accordingly, "^X" indicates that the data sequence beginning with the uppercase letter "X" is searched.

As special search patterns, there are two patterns "@BEGIN" and "@END". Although these patterns are described in a pattern column, they do not indicate search conditions and are like one type of commands. "@BEGIN"

instructs an action (such as "ST-0" indicating a range registration start, which will be described later) to be unconditionally performed at the beginning of the process. "@END" instructs an action (such as "ED-0" indicating a range registration end, which will be described later), which is specified in a control column, to be unconditionally performed at the end of the process.

Then, control codes (operations and actions) are described together with the descriptions of the search patterns as shown in the control column 31-2 on the input screen shown in FIG. 6A. The control codes are selected from a control code table 32 displayed on the screen shown in FIG. 6B, and input to the control column 31-2.

"SKIP" included in the control code table 32 shown in FIG. 6B indicates that a corresponding line is skipped and not captured. "GREP" indicates that the corresponding line is captured. "ST-0" is attached to the line indicating the start of the data sequence in the process of a block (a child board structuring a multi-plane board). "ED-0" is attached to the line indicating the end of the data sequence in the process of the block. "EX-0" indicates that the process is repeated from the first board until the last board in the process of the block of a multi-plane board. "D" indicates that a soldering paste is only spread in the coordinate position specified by the data sequence. "M" indicates that a part is only mounted in the coordinate position specified with the data sequence. In this case, whether the soldering paste is spread either before or after the mounting does not matter. "N" indicates that neither the spreading nor the mounting are performed. A board may be sometimes designed in such a manner that only the mounting position of a new part is secured beforehand in order to cope with a design change of a main device to which the board is installed, depending on a user. "N" is a control command corresponding to this situation. "O" indicates that an on-board mark for determining the position of a board is recognized with one point. "P" indicates that an on-board mark for determining the position of the board is recognized with two points. "Q" indicates that a special-purpose mark is recognized immediately before the mounting of a part which particularly requires a mounting accuracy. "PCB" indicates that the data of the X and Y of a line are set as the size of a board, while "OFF" indicates that the X, Y, and θ of the corresponding line are offset, although these are not shown in this figure. An offset value is read from the offset data area of design data to be converted. If there is no offset data, it is set with a manual input.

To thus generated special command specification table, up to ten pairs of the above described search pattern and control code can be input. If there is the table including up to ten pairs of the search pattern and the control code, the coordinate data of all the parts to be mounted on one board can be converted.

The above described control code (action) is processed with an AND condition starting from the code specified in the description line in an upper order. Assume that certain CAD data is like the following data in the delimiter format.

T, 100, 123, 0, R105K

B, 200, 456, 0, C100uF

T, 300, 789, 180, Tr1150

T, 300, 200, 0, Mark-01

T, 300, 180, 0, IC-512

Comment-Line

B, 100, 40, 0, Mark-01

B, 100, 50, 0, F100D

Also assume that the search pattern for specifying the search of "T" (top side of a double-sided mounting board) is described in the first line of special-purpose command specification, and "GREP" is specified for its control code. If the search pattern for specifying the search of "Mark-01" is described in the second line and "Q" is specified for its control code, capturing is not made if the searched item of the data sequence does not match the search pattern "T" of the control code "GREP" specified in the first line of the special-purpose command specification even if it matches the search pattern "Mark-01" of the control code "Q".

That is, in the above described CAD data, the fourth data sequence "T, 300, 200, 0, Mark-01" from the top is captured up to the portion corresponding to the search pattern in the second line, and the captured data is converted into the record for which the action of the control code "Q" in the second line must be performed. The data sequence "B, 100, 40, 0, Mark-01" in the second line from the bottom includes the search pattern "Mark-01" of the control code "Q", but it is not captured. This is because it does not match the search pattern "T" in the first line. Namely, it does not become a conversion target.

If only the mounting data (record and data sequence) on the top (T) side of the board is captured as described above, the search pattern for capturing the record beginning with "T" is described in the first line of the special command specification, and "GREP" is described for the control code. If the part name "Mark-01" is the part for recognizing a special-purpose mark in the mounting data of the top "T" side, the search pattern of "Mark-01" is described in the second line and its control code is set to "Q". If the first and second lines are exchanged, also the mounting data "B, 100, 40, 0, Mark-01" of the bottom (B) side will be captured.

As the setting order of the control codes, the control codes for specifying block (range registration) data, mark data, line skipping, etc. are set (described) beforehand, and the control code for specifying line capture is lastly set. After all the settings are made, the control codes are registered.

As described above, the conversion parameter table in the memory 33, which is shown in FIG. 2, is generated. The coordinate data for mounting parts, which are generated by another system, are converted with the process shown in FIG. 2A based on the conversion parameter master table in the memory 33.

In FIG. 2A, the conversion parameter file according to the format of the data file at a conversion source is specified (step S1). This process is a process for specifying (selecting) any of the above described address format, delimiter format, and fixed-column format, which are registered to the conversion parameter master table in the memory 33, with a keyboard input based on an instruction on a display screen.

Next, a conversion source file name, a conversion destination file name, a board (PCB) size, and a flow direction are input (step S2). The operations for inputting the PCB size and the flow direction in this process are the operations with which the data of the data items such as the (6) flow direction and the (7) PCB size, which can be changed also immediately before the conversion process, are used unchanged, or the data are changed with an input if they are to be changed.

Then, the above described conversion source data file specified with an input is read from a predetermined area of the memory 34, converted into the conversion destination data file based on the conversion parameter in the read conversion parameter file with a conversion process to be later described in detail, and is stored as the specified conversion destination data file in a predetermined area in the memory 35 (step S3). In this way, the conversion process of the coordinate data is completed.

Figure 7:
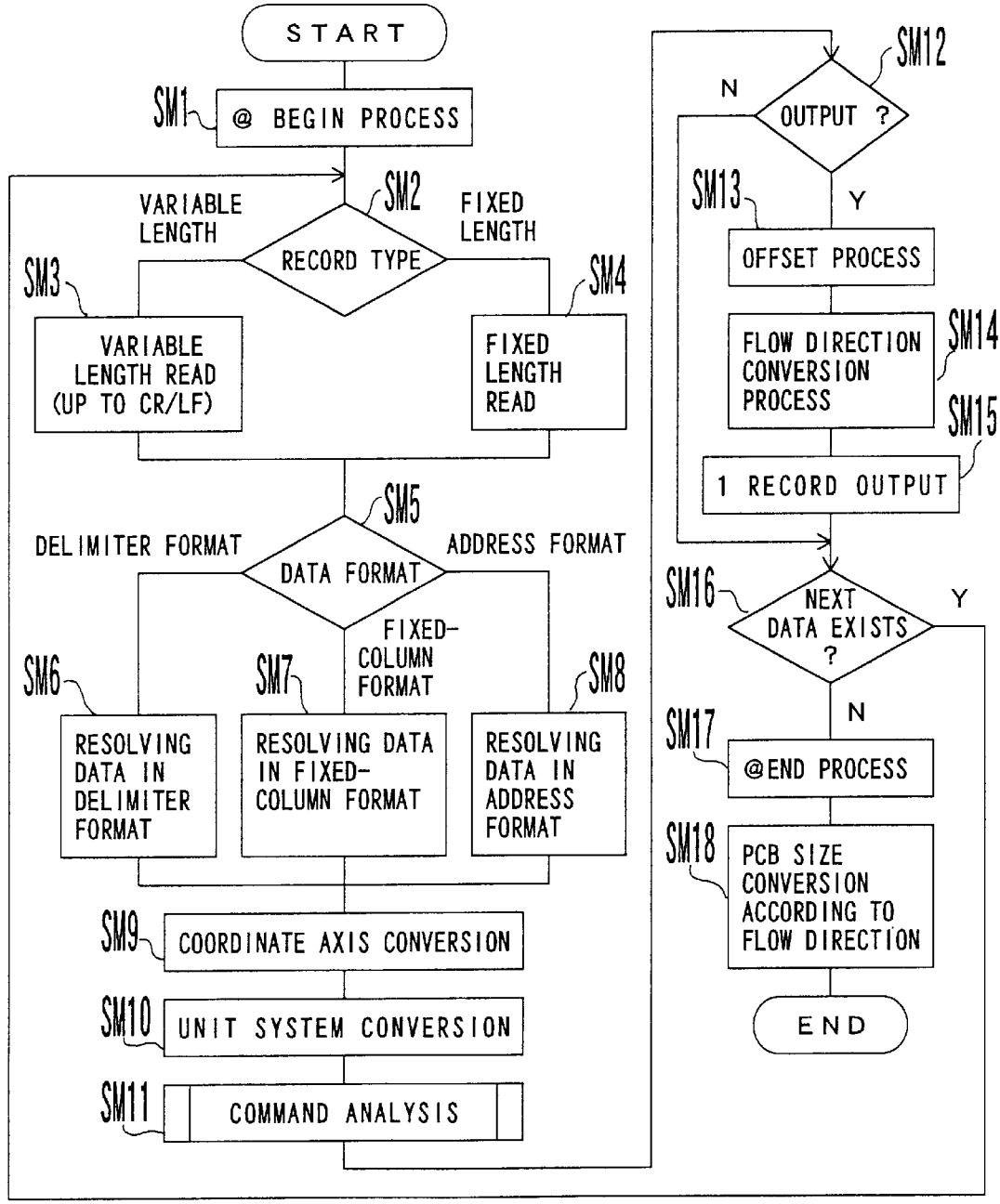
FIG. 7 is a flowchart showing the conversion process in step S3 of the coordinate data conversion process shown in FIG. 2A.

FIG. 7 is a flowchart showing the details of the above described process for converting the conversion source data file into the conversion destination data file based on the conversion parameter, which is performed in step S3. FIGS. 8A, 8B, and 8C show the data structures of the work file which is temporarily generated for the conversion destination data file in this process. As shown in FIGS. 8A, 8B, and 8C, the work file corresponds to the data structure of the conversion destination data file, which will be described later, and is described in lines. The lines are divided into six item columns from item columns 41 through 46. In the item column 41, the coordinate data of the X axis converted from the record of the conversion source data file is stored. In the item column 42, the coordinate data of the Y axis is stored in a similar manner. In the item column 43, the angular data is stored. If the record of the conversion source data file is not the coordinate data, "0" as an initial value is set. In the item column 44, the control description for the record is stored. In the item column 45, the part name read from the conversion source data file is stored. In the item column 46, the comment data is stored. The respective data in the data formats exemplified in FIGS. 5A, 5B, and 5C are temporarily stored in the respective columns in the work file shown in FIG. 8A. The control code (command) stored in the item column (44) in the work file will be described later.

In the flowchart shown in FIG. 7, @BEGIN process is first performed (step SM1). If there is the data to be initially output independently of the conversion parameter in this process, the data is specified and output in this step. For example, these operations are performed for inserting the start of an unconditional block repeat. The block repeat will be described later.

Next, the record type is determined according to the item (1) of the conversion parameter file, and a branch is executed according to the determined record type (step SM2). That is, if the record length is a variable-length, the data of the conversion source data file is read up to a CR or an LF (step SM3). If the record length is a fixed-length, the data is read up to a preset length (step SM4).

Succeeding the above described step SM3 or SM4, the data format is determined according to the item (2) in the conversion parameter file (step SM5). If the data format is the delimiter format, the data which has been just read is resolved according to the rules of the delimiter format (step SM6). In this way, for example, the data sequence "12, 22, 32, Chip-R, R10" in the delimiter format, which is shown at the bottom of FIG. 5B, is resolved (converted) into "12", "22", "32", "Chip-R", and "R10" using the delimiter ",". The converted data are stored in the respectively corresponding columns "41", "42", "43", "45", and "46" as shown in the work file of FIG. 8A.

If the data format is the fixed-column format in step SM5, the data which has been just read is resolved according to the rules of the fixed-column format (step SM7). As a result, for example, the data sequence "12_22_32Chip-RR-10" in the fixed-column format, which is shown at the bottom of FIG. 5C, is resolved in a similar manner, and the resolved data are stored in the respective columns 41, 42, 43, 45, and 46 as shown in the work file of FIG. 8A.

If the data format is the address format in step SM5, the data which has been just read is resolved according to the rules of the address format (step SM8). As a result, for example, the data sequence "X12Y22R32P (Chip-R) C(R-10)" in the address format, which is shown at the bottom of FIG. 5A, is resolved in a similar manner, and the resolved data are stored in the respective columns 41, 42, 43, 45 and 46 as shown in the work file of FIG. 8A also in this case.

Succeeding the above described step SM6, SM7, or SM8, the coordinate axes are converted (step SM9). With this process, the coordinate system is converted by using the item (3) in the conversion parameter file. This conversion is performed in such a way that the coordinate after the conversion is indicated by the coordinate system "(plus y, plus x)". Namely, if θ of the source data is in an opposite direction, "θ=θ×(−1)". If "x" is in an opposite direction, "x=x×(−1)". If "y" is in an opposite direction, "y=y×(−1)". As a result, all of the coordinate systems shown in FIGS. 3B, 3C, and 3D are converted into the coordinate system shown in FIG. 3A (the first quadrant of a normal coordinate system).

Then, the unit system is converted (step SM10). With this process, the unit system is converted by using the item (4) in the conversion parameter file. This conversion is performed in such a way that the distance after the conversion becomes an mm unit system and the angle becomes a ° unit system. Assuming that the source data is represented by "1000" and this data indicates 1mm, the magnification "0.001" is set with the maintenance process. Based on such magnification data, the arithmetic operations "x=x× (magnification of x)", "y=y×(magnification of y)", and "θ=θ×(magnification of θ)" are performed. If the magnification data of the item (4) is the above described "0.001", both of the data in the item column 41 of the X axis and the item column 42 of the Y axis are converted and rewritten as shown in the item columns 41 and 42 shown in FIG. 8B. The magnification of θ (an amount of a correction) is similar.

Next, the command is analyzed (step SM11). This process is a process for the commands (control codes) described in the control column 31-2 shown in FIG. 6A. Here, the details of this process is further described.

Figure 9:
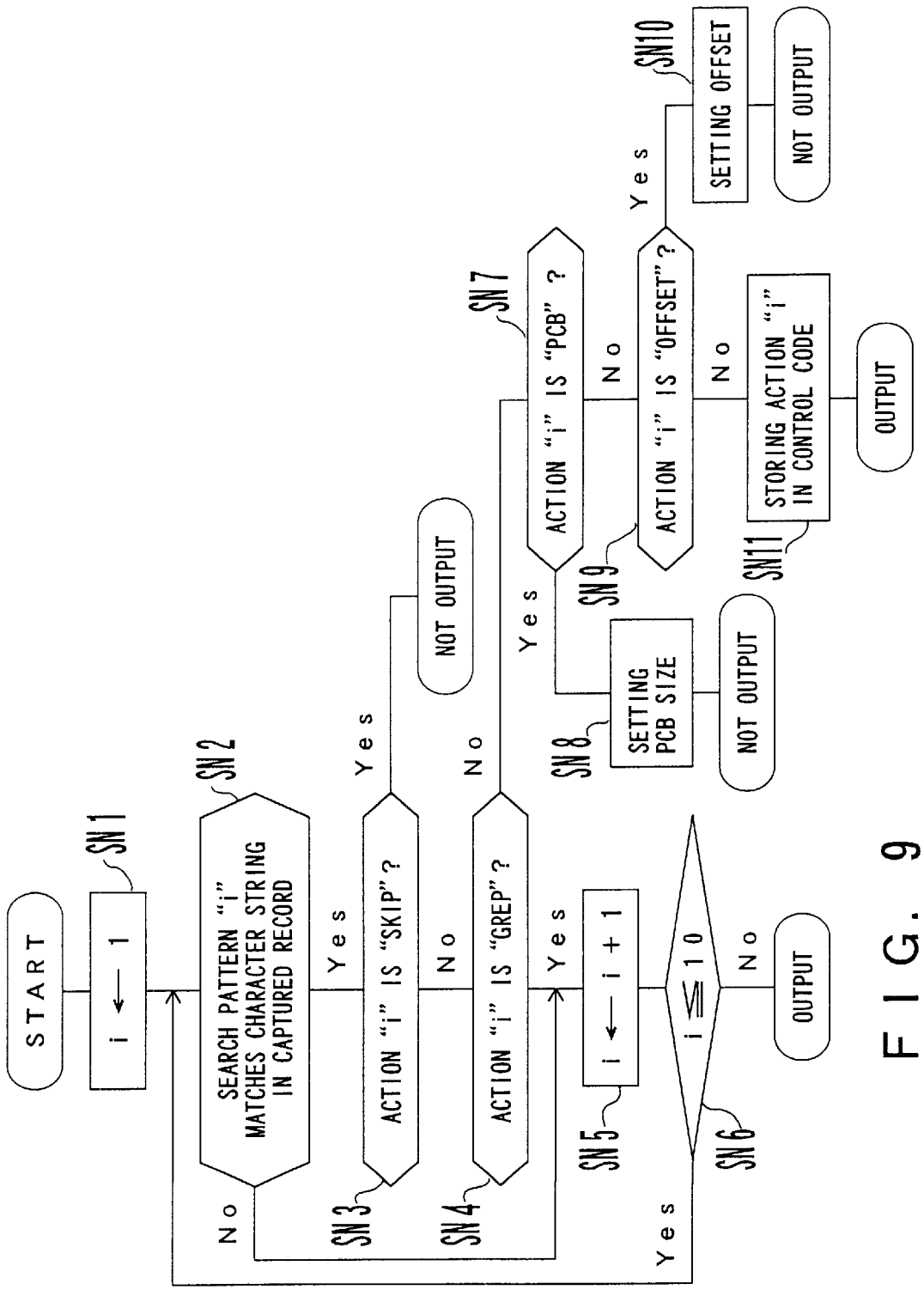
FIG. 9 is a flowchart showing the command analysis process in step SM11 of the conversion process shown in FIG. 7.

FIG. 9 is a flowchart showing the above described process for analyzing a command in step SM11. Note that an internal counter "i" is used for the CPU 60 in this process. In the flowchart shown in this figure, "1" is assigned to the counter "i" in step SN1. The value "i" assigned to the counter "i" (both the counter name and its value are referred to as the "i" hereinafter) indicates the description order of the search patterns in the conversion parameter file, which are read from the conversion parameter master table in the memory 33 shown in FIG. 2 with the specification made in step S1 of FIG. 2, and are exemplified in FIG. 6A.

Then, it is determined whether or not there is the description (character string) which matches the search pattern specified in the conversion parameter file ("i"th search pattern) in the character string in the captured record in step SN2. Since "i" first equals 1, the determination made for the search pattern described in the first row in the search parameter file in this case. It is determined whether or not the captured record includes the character string which matches "MARK" exemplified in the first row in FIG. 6A.

If the searched record does not include the character string "MARK", the "i"th (first) search pattern does not match the above described record ("NO" in step SN2). In this case, the process immediately goes to step SN5, where the register "i" is incremented and the next search pattern is specified. It is then determined whether or not the value "i" of the register "i" does not exceed "10" in step SN6). If "YES" in step SN6, the process goes back to step SN2. If the search pattern does not match the character string in the record, steps SN2, SN5, and SN6 are repeated. As a result, the order of the search patterns is specified to sequentially go down from the highest (sequentially from the top to the bottom in the example of FIG. 6A).

If the "i"th search pattern matches the character string in the record in step SN2 ("YES" in step SN2), it is determined whether or not the action "i" (the control code described for the "i"th search pattern) of the "i"th search pattern is "SKIP".

Assuming that "i" equals "5", the "i"th, that is, the fifth search pattern is "R*" in the example shown in FIG. 6A, and the character string in the record matches the "R*" in step SN2. For the action "i", "SKIP" is specified (described) at this time ("YES in step SN3). Because "SKIP" is the instruction which does not capture the record into the conversion destination file as described above, the flag indicating that the record is not output is set in this case. Control is then returned to the process shown in FIG. 7. As described above, if the control code specified in the search pattern which matches the character string in the record is "SKIP", the read record is not captured.

On the other hand, assuming that "i" equals "6", the "i"th, that is, the sixth search pattern is "^X" in the example shown in FIG. 6A, and the character string in the record matches the "^X" in the above described step SN2. And also, "GREP" is specified (described) for the action "i", that is, "SKIP" is not specified ("NO" in step SN3). Therefore, the process goes to the next step SN4 in this case.

In step SN4, it is determined whether or not the action "i" is "GREP". Since it is "GREP" in the above described example ("YES" in step SN4), the above described operations in steps SN5 and SN6 are performed in this case. If "i" is still equal to or less than 10, the process goes back to step SN2. For example, if another search pattern (such as BB) corresponding to the action "GREP" is described in this process cycle "i" in the search parameter file in addition to the "i−1"th search pattern (such as AA) searched in step SN2 in the preceding process cycle "i−1", the result of the determination "i≦10" will become "NO" in step SN6 on the condition that the character string in the record, which is being processed, includes the character strings "AA" and "BB". Therefore, the flag indicating an output (capture) is set and control is returned to the process shown in FIG. 7 in this case. As a result, the read record is captured also in this case.

If no other search pattern corresponding to the action "GREP" is described in this process cycle "i", and if the record includes no character pattern matching the search pattern of the action "i" other than the action "GREP", the result of the determination "i≦10" made in step SN6 will become "NO" after several process cycles. Therefore, the output flag is set and control is returned to the process shown in FIG. 7 also in this case. As a result, the read record is captured also in this case. For example, also the work file shown in FIG. 8B corresponds to the record whose capture is determined with the search pattern "^X" and the action "GREP" (the record after conversion).

Even if the search pattern (such as BB) again matches the character string in the record in step SN2 in this process cycle "i", the result of the determination made in step SN4 is "NO" on the condition that the action "i" of the search pattern BB is not "GREP". Accordingly, control is transferred to the process in and after step SN7 and whether or not to capture the record is made pending. Accordingly, if "GREP" is respectively specified for different search patterns in the search parameter file when the record is captured with the action "GREP", the capture of the record is determined only if the different search patterns are included in the character string in the record (AND condition).

In addition to the above described case, the result of the determination made in step SN4 will become "NO" if the search pattern matches the character string in step SN2 and if the action "i" is neither "SKIP" nor "GREP". Therefore, control is transferred to step SN7 in this case, too.

In step SN7, it is determined whether or not the "i"th action is "PCB" (the specification for capturing only the board size). If the action "i" is "PCB" ("YES" in step SN7), the board size is set in a predetermined memory area in step SN8. Since the record after the capture of the board size is no longer needed, the flag for not outputting the record is set and control is returned to the process shown in FIG. 7. Note that the action "PCB" is described in th search parameter file if it is known beforehand that the record including the board size description exists in the data of the conversion source file.

If the action "i" is not determined to be "PCB" in step SN7 ("NO" in step SN7), the process goes to step SN9 where it is determined whether or not the action "i" is "OFFSET". If the action "i" is "OFFSET" ("YES" in step SN9), the record being processed is a record indicating the amount of an offset of each data. In this case, the process goes to step SN10 where the offset value data of the record is set in a predetermined memory area. After that, the flag for not outputting the record is set and control is returned to the process shown in FIG. 7, because the record whose offset value data has been captured is no longer needed.

If the action "i" is not determined to be "OFFSET") in the determination made in step SN9 ("NO" in step SN9), the process goes to step SN11 where the action "i" is stored in a control code column and the output flag is set. Control is then returned to the process shown in FIG. 7. As described above, if the action "i" is neither "SKIP", "GREP", "PCB", nor "offset", the action "i" described in the search parameter file, for example, "ST-0" is stored in the control column 44 as shown in the example of the work file of FIG. 8C. The record of this work file is captured into the conversion destination file as a record after the conversion as will be described later.

Turning back to the flowchart shown in FIG. 7. Succeeding the termination of the above described command analysis process, it is determined whether or not the record being processed is output by referencing the flag (step SM12). If "YES" in step SM12, the offset process is first performed (step SM13). This process is a process for firstly correcting the coordinate data according to the offset values (offset x, offset y, offset θ) of the search parameter file, that is, correcting the coordinate data to x=x+(offset x), y=y+(offset y), and θ=θ+(offset θ), and for secondly making a correction according to the offset value set in step SN10. With this process, for example, the data in the work file, which are shown in FIG. 8B, are to be rewritten.

Then, the flow direction is converted (step SM14). This process is a process performed when the operations are actually performed by conveying parts to a part mounting device as shown in FIGS. 4B, 4C, or 4D, even if CAD data is generated, for example, as the data shown in FIG. 4A.

Figure 4B:
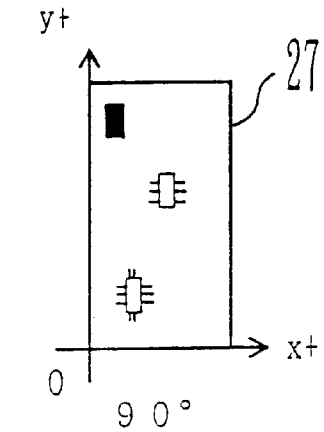
Figure 4C:
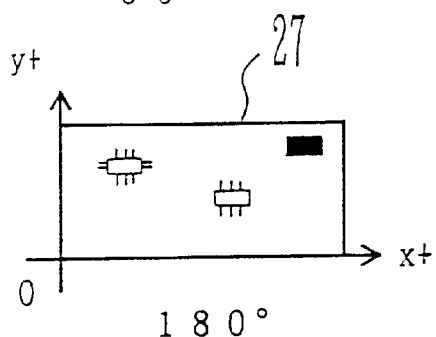
Figure 4D:
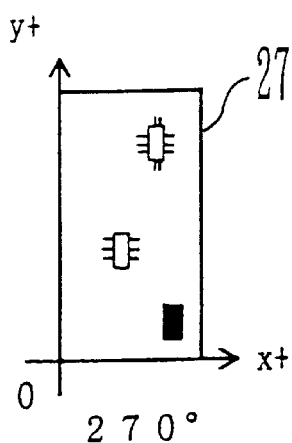

In the cases shown in FIGS. 4B, 4C, and 4D, the conversion of 90°, 180°, or 270° is performed for the X axis data and the Y axis data. Furthermore, the coordinate system is converted into the first quadrant (the coordinate system of the conversion destination file) shown in FIG. 3A.

The converted record (the line record of the work file) is then output to the conversion destination file in the memory 35 (step SM15). In this way, the conversion for one record is completed. Then, it is determined whether or not there is the next data (next record) (step SM16). If it is determined that there is the next record("YES" in step SM16), the process goes back to step SM2 and steps SM2 through SM16 are repeated. As a result, for example, all the records of the CAD data in the conversion source file are read out and converted as described above.

If it is determined that there is no next record in the determination made in step SM16, @END process is performed (step SM17). With this process, if there is the data to be lastly output independently of the conversion parameter output, it is specified and output in this step. Then, the board size is converted according to the flow direction (step SM18). This process is a process for exchanging the "X" and "Y" of the board size if the flow direction is the direction shown in FIG. 4B or 4D. In this way, the conversion process is completed.

FIG. 10A exemplifies the conversion source file (CAD data 37) to be read from the memory 34 with the above described process. The data format is the delimiter format, and a space is used as a delimiter in this example. FIG. 10B exemplifies the search parameter file 38 (similar to the example shown in FIG. 6A although its description is different), which is selected in correspondence with the CAD data 37 and is read from the memory 33. FIG. 10C exemplifies the conversion destination file 39 which is converted from the CAD data 37 based on the conversion parameter file 38 and is written to the memory 35 via a work file.

Figure 11:
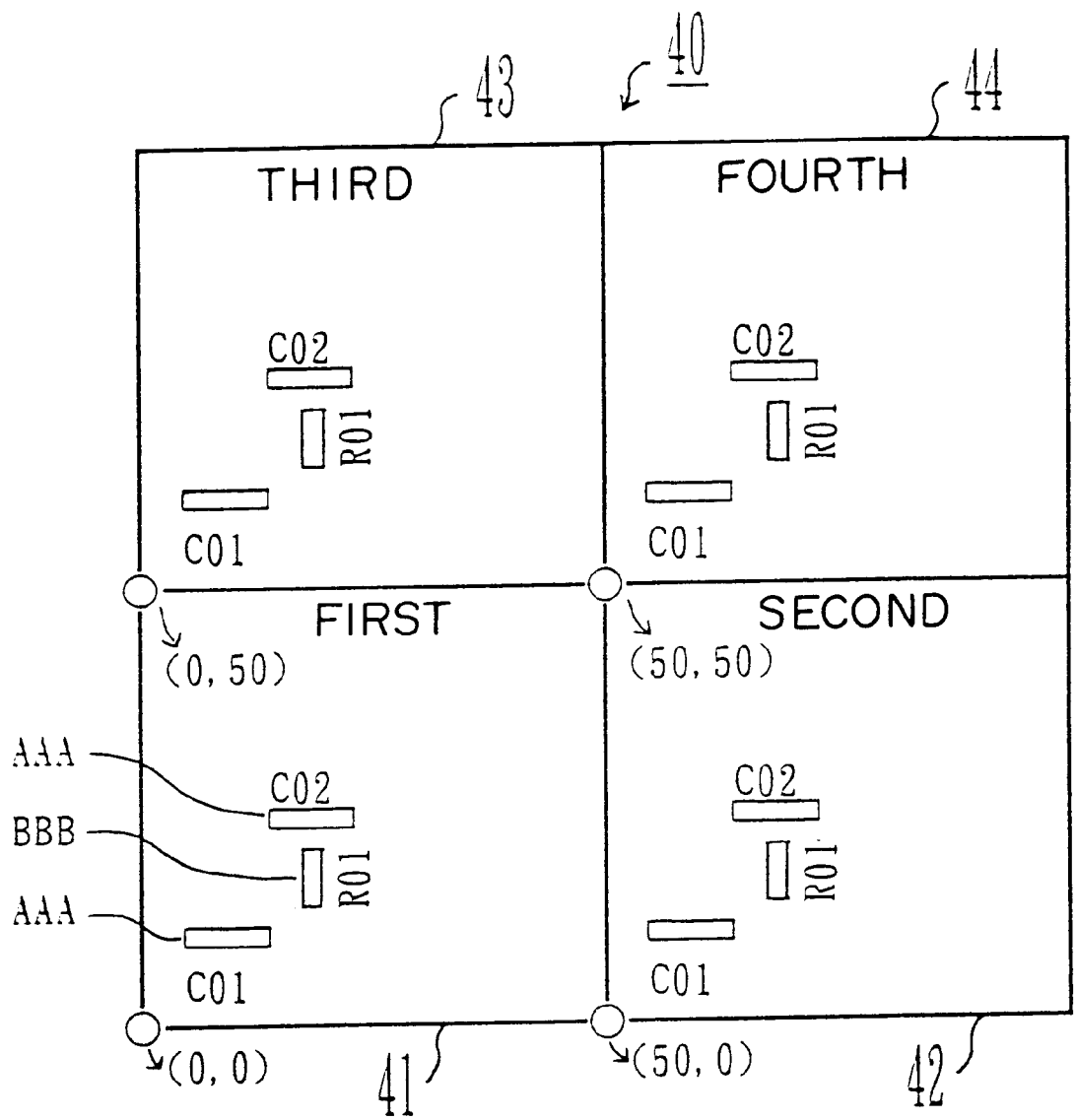
FIG. 11 exemplifies a parent board composed of four childboards as a multi-plane board.

FIG. 11 exemplifies a multi-plane board. This figure shows a parent board 40 composed of four child boards 41, 42, 43, and 44, which are connected in a four-section shape. Both of the lengths in the X and Y axes directions are 50 mm. Accordingly, both of the lengths in the X and Y axes directions of the parent board 40 are 100 mm (here, the separation margin is ignored). The origin of the first child board 41 is the same coordinate (0, 0) as that of the parent board. Accordingly, as shown in this figure, the origin of the second child board 42 is the same as the coordinate (50, 0) of the parent board 40; the origin of the third child board is the same as the coordinate (0, 50) of the parent board 40; and the origin of the fourth child board 44 is the coordinate (50, 50) of the parent board 40. On the child boards 41 through 44, the mounting position marks "C01", "C02", and "R01" are silk-printed. In the example shown here, the part AAA of an identical type is respectively mounted in the mounting position marked with "C01" and "C02", while another part BBB is mounted in the mounting position marked with "R01". Since each of the child boards 41 through 44 is the process unit for mounting a group of parts of an identical combination on the parent board 40, each of the child boards is referred to as also a block.

When the record "START" in the first line is read from the CAD data 37 shown in FIG. 10A, a search is performed by using the search patterns in the search parameter file 38 sequentially from the top and a search is performed. In this case, the record in the first line corresponds to the search pattern "START" in the first line. The action (action "i") of the search pattern "^START" is "ST-0". Since "ST-0" is neither "SKIP", "GREP", "PCB", nor "OFFSET", the action "ST-0" is written to the control column in the first line of the conversion destination file 39 unchanged. The other X, Y, and θ columns include the initial value "0". The part name and comment columns include the character string of a 0-character-length (no character string) as an initial value.

When the record "T1 10.0 15.0 00.0 AAA C01" in the second line is next read from the CAD data 37, a search is performed by using the search patterns in the search parameter file 38 sequentially from the top also in this case. The record in the second line corresponds to the search pattern "^T [0–9]" in the fourth line in this case. The action of the search pattern "^T[0–9]" is "GREP". If the search pattern corresponding to the character string in the record in the second line is not described in the search patterns in the fifth and subsequent lines, the record in the second line is captured. That is, the record is written to the second line of the conversion destination file 39.

Additionally, the record "T2 15.0 20.0 90.0 BBB R01" in the third line of the CAD data 37 is read out and written to the third line of the conversion destination file 39 in a similar manner as for the previous record. Furthermore, the record "T3 15.0 25.0 00.0 AAA C02" in the fourth line of the CAD data 37 is read out and written to the fourth line of the conversion destination file 39 in a similar manner.

The record "END" in the fifth line is then read from the CAD data 37. It corresponds to the search pattern "END" in the second line. The action of the search pattern "^END" is "ED-0". Since also the "ED-0" is neither "SKIP", "GREP", "PCB", nor "OFFSET", the action "ET-0" is written to the control column in the fifth line of the conversion destination file 39 unchanged. Also in this case, the other X, Y, and θ columns include the initial value "0" and the part name and comment columns include the character string of a 0-character-length which is the initial value.

Then, the record "E1 0.0 0.0 0" in the sixth line is read from the CAD data 37. It corresponds to the search pattern "^E[0–9]" in the third line. The action of this search pattern "^E[0–9]" is "EX-0". Because also the "EX-0" is neither "SKIP", "GREP", "PCB", NOR "OFFSET", each resolved data is captured and written to the sixth line of the conversion destination file 39. The action "EX-0" is written to its control column unchanged.

Furthermore, also the record "E2 50.0 0.0 0" in the seventh line of the CAD data 37, the record "E3 0.0 50.0 0" in the eighth line, and the record "E4 50.0 50.0 0" in the ninth record are respectively written to the seventh, eighth, and ninth lines in the conversion destination file 39 in a similar manner as for the previous records.

As described above, "CS" code indicating the coordinate data for a local system is set in the coordinate data (conversion destination file 39) generated by being converted from the CAD data, thereby generating a part mounting program by using the coordinate data. Because the part mounting program is not a principal part of the present invention, its explanation is not provided here. However, the brief explanation about the relationship between the part mounting program and the records in the conversion destination file 39 is provided below for reference.

The control code "ST-0" in the first line of the record in the conversion destination file 39 indicates the start of range registration. This indicates that the parts AAA, BBB and AAA in the second to fourth lines between the control code "ST-0" and the control code "ED-0" in the fifth line, which indicates the end of the range registration, are repeatedly mounted on the child boards 41 through 44 (block processing) according to their mounting data.

The control code "EX-0" in the sixth line, which follows the control code "ED-0" of the end of the range registration, indicates the block processing. Its X and Y coordinate data "0. 0" and "0. 0" indicate both the origin coordinate of the first child board 41 on the parent board 40 and the offset values of the coordinate data. Accordingly, both of the offset values of the X and Y are "0" in this case. As a result, programming is performed in such a way that the parts AAA, BBB, and AAA in the records in the second and third lines, for which the range registration is made, are respectively mounted in the mounting positions "C01", "R01", and "C02" on the child board 41 of FIG. 11 based on their coordinate data "10.0 150.0 0", "150.0 20.0 90" and "15.0 25.0 0". Programming is also performed in such a way that the part BBB in the mounting position "R01" is mounted by being rotated by 90° based on the θ data "90" included in the coordinate data "15.0 20.0 90".

Since also the control code in the seventh line is "EX-0", which indicates the block process, programming is performed in such a way that the parts AAA, BBB, and AAA in the second and third lines are respectively mounted in the mounting positions "C01", "R01", and "C02" on the second child board 42 of FIG. 11 also based on the coordinate data "10.0 15.0 0", and "15.0 20.0 90", and "15.0 25.0 0" by using the origin coordinate data of the X and Y "50.0" and "0.0" as offset values. Also the control code "EX-0" in the eighth line and the control code "EX-0" in the ninth line are processed in a similar manner, so that the three respective parts AAA, BBB, and AAA are programmed to be mounted on the child boards 43 and 44 of FIG. 11.

As described above, according to the present invention, a master table (conversion parameter master table) for data conversion patterns, which can be arbitrarily added, modified, deleted, etc., is prepared, so that the coordinate data of another system can be easily converted into the coordinate data for a local system.

What is claimed is:

1. A coordinate data converting device, comprising:
    editing means for allowing a parameter of a table, which makes a correspondence between coordinate data of another system and coordinate data of a local system, to be edited with an input;
    capturing means for sequentially capturing the coordinate data generated by another system in a record unit;
    coordinate system converting means for converting a coordinate system of the coordinate data captured by said capturing means into a coordinate system of the coordinate data of the local system while referencing the parameter of the table;
    coordinate value converting means for expanding, reducing, rotating, or parallel translating the coordinate data converted by said coordinate system converting means according to the coordinate system and a unit of the coordinate data of the local system while referencing the parameter of the table;
    skipping means for stopping capture of the record if a character string in the record captured by said capturing means matches a predetermined search pattern in reference to the parameter of the table;
    capturing determining means for determining the capture of the record if the character string in the record captured by said capturing means matches the predetermined search pattern in reference to the parameter of the table;
    control addition capturing means for adding a control code preset in the table in correspondence with the predetermined search pattern to the record if the character string in the record captured by said capturing means matches the predetermined search pattern in reference to the parameter of the table, and capturing the record;
    flow coordinate converting means for further coordinate-converting the coordinate data converted for the local system by said coordinate system converting means according to a flow direction of a board while referencing the parameter of the table; and
    outputting means for outputting the coordinate data converted for the local system.

2. A coordinate data converting method for converting coordinate data generated by another system into coordinate data of a local system by using a programmed computer, comprising the steps of:
    allowing a parameter of a table, which makes a correspondence between coordinate data of another system and coordinate data of a local system, to be edited with an input;
    sequentially capturing the coordinate data generated by another system in a record unit;
    converting a coordinate system of the captured coordinate data into a coordinate system of the coordinate data of the local system while referencing the parameter of the table;
    expanding, reducing, rotating, or parallel translating the converted coordinate data according to the coordinate system and a unit of the coordinate data of the local system while referencing the parameter of the table;
    stopping capture of the record if a character string in the captured record matches a predetermined search pattern in reference to the parameter of the table;
    determining the capture of the record if the character string in the captured record matches the predetermined search pattern in reference to the parameter of the table;
    adding a control code preset in the table in correspondence with the predetermined search pattern to the record if the character string in the captured record matches the predetermined search pattern in reference to the parameter of the table, and capturing the record;
    further coordinate-converting the coordinate data converted for the local system according to a flow direction of a board while referencing the parameter of the table; and
    outputting the coordinate data converted for the local system.

3. A storage medium storing a program for converting coordinate data generated by another system into coordinate data of a local system, the program directing a computer to perform the functions of:
    allowing a parameter of a table, which makes a correspondence between coordinate data of another system and coordinate data of a local system, to be edited with an input;
    sequentially capturing the coordinate data generated by another system in a record unit;
    converting a coordinate system of the captured coordinate data into a coordinate system of the coordinate data of the local system while referencing the parameter of the table;
    expanding, reducing, rotating, or parallel translating the converted coordinate data according to the coordinate system and a unit of the coordinate data of the local system while referencing the parameter of the table;
    stopping capture of the record if a character string in the captured record matches a predetermined search pattern in reference to the parameter of the table;
    determining the capture of the record if the character string in the captured record matches the predetermined search pattern in reference to the parameter of the table;
    adding a control code preset in the table in correspondence with the predetermined search pattern to the record if the character string in the captured record matches the predetermined search pattern in reference to the parameter of the table, and capturing the record;
    further coordinate-converting the coordinate data converted for the local system according to a flow direction of a board while referencing the parameter of the table; and
    outputting the coordinate data converted for the local system.

* * * * *

UNITED STATES PATENT AND TRADEMARK OFFICE
CERTIFICATE OF CORRECTION

PATENT NO.    : 6,125,304
DATED         : September 26, 2000
INVENTOR(S)   : Takashi Suzuki It is certified that error appears in the above-identified patent and that said Letters Patent is hereby corrected as shown below:

Title page,
Item [30], insert
-- Item [30] Foreign Application Priority Data
 June 26, 1997  [JP] …….. 09-169750 --.
Delete all of the following:
"Item [56], References Cited,
          U.S. PATENT DOCUMENTS
4,734,864    3/1998      Kawamura et al. ………364/474.23
5,270,627    12/1993     Rehse …………………318/585
5,696,837    12/1997     Green …………………382/128
5,751,586    5/1998      Grabovac ……………...700/169".

Signed and Sealed this

Seventeenth Day of September, 2002

Attest:

JAMES E. ROGAN
*Attesting Officer*   *Director of the United States Patent and Trademark Office*